United States Patent [19]

Bass et al.

[11] 4,153,302

[45] May 8, 1979

[54] MOTOR VEHICLE SAFETY WHEEL

[76] Inventors: Melvin L. Bass, 2262 Kaydel St., Whittier, Calif. 90601; Wesley E. Buford, 1042 Wingate, Covina, Calif. 91723

[21] Appl. No.: 835,633

[22] Filed: Sep. 22, 1977

[51] Int. Cl.² .............................................. B60C 17/00
[52] U.S. Cl. .................................... 301/39 T; 152/406
[58] Field of Search ........................ 295/8.5, 9 R, 9 A; 152/152, 167, 208, 220, 397, 398, 405, 406, 409, 410; 301/11 R, 13 R, 14, 27, 28, 35 SS, 35 SL, 38 R, 39 T, 39 C, 40 R, 40 S

[56] References Cited

U.S. PATENT DOCUMENTS

| 1,507,671 | 9/1924 | Greene | 152/406 |
| 2,019,120 | 10/1935 | Cunningham et al. | 301/39 T |
| 3,397,014 | 8/1968 | Nigrelli | 301/39 T |

FOREIGN PATENT DOCUMENTS 226077  5/1958  Australia ................. 301/39 T

Primary Examiner—Robert J. Spar
Assistant Examiner—H. Grant Skaggs
Attorney, Agent, or Firm—William P. Green

[57] ABSTRACT

A safety wheel for a truck or other motor vehicle, having a safety flange which is attached to a wheel body at essentially the location of its tire mounting rim, with the safety flange desirably being located at the axially inner side of the tire and projecting generally radially outwardly to a peripheral edge which is of a diameter sligthly less than the inflated diameter of the tire and is adapted upon deflation of the tire to engage the road surface and support the vehicle therefrom.

2 Claims, 3 Drawing Figures

MOTOR VEHICLE SAFETY WHEEL

BACKGROUND OF THE INVENTION

This invention relates to improved safety wheels for preventing a truck or other heavy motor vehicle from going out of control in the event of a tire blow-out or other deflation of the tire.

Loss of inflation of a tire while a vehicle is traveling at rapid speed can result in a very serious accident, particularly in the case of a truck or other very heavy vehicle. The danger is especially great when the front tire of such a vehicle becomes deflated, because of the use of the front wheels in steering, and because dual tires cannot be employed in the front as in the back.

In order to minimize the danger in the event of such deflation of a tire, prior expedients have been proposed which include annular rigid elements located within the tire and adapted to prevent its deflation beyond a certain point. These arrangements, however, require very special wheel and tire structures which are complex and expensive. It has also been proposed that a flange be connected to the wheel mounting hub by the usual lug nuts, and project outwardly at the outside of the tire for engagement with a road surface upon deflation of the tire.

SUMMARY OF THE INVENTION

The present invention provides a unique safety wheel arrangement in which a safety flange is attached to a wheel body at essentially the location of the tire mounting rim of the body, and projects generally radially outwardly to a peripheral edge of a diameter slightly less than the normal inflated diameter of the tire, so that upon deflation of the tire the flange engages and rolls along the road surface in a manner supporting the load at a level only slightly lower than the support level when the tire was inflated. In its broadest aspects, the invention contemplates either permanent or detachable connection of the safety flange to the wheel rim, but the presently preferred arrangement is one in which the attachment is rigid and permanent. Desirably, the flange is located at the axially inner side of the wheel, and has a radially inner portion which functions as the retaining ring for engaging and retaining the axially inner bead of the tire. When the rim is thus located at the axially inner side of the tire, the tire can be removed axially outwardly without detachment of the flange, and also the flange is then positioned at an optimum location for best load support. The usual resilient retaining ring may be provided at the axially outer side of the tire for engaging the second bead and holding the tire on the rim of the wheel. In our copending application Ser. No. 835,634 filed Sept. 22, 1977, on "Vehicle Safety Wheel", we disclose and claim specifically a variational arrangement in which a safety flange is carried by a wheel at the axially outer side of a tire.

BRIEF DESCRIPTION OF THE DRAWING

The above and other features and objects of the invention will be better understood from the following detailed description of the typical embodiment illustrated in the accompanying drawing in which.

DESCRIPTION OF THE PREFERRED EMBODIMENT

Figure 1:
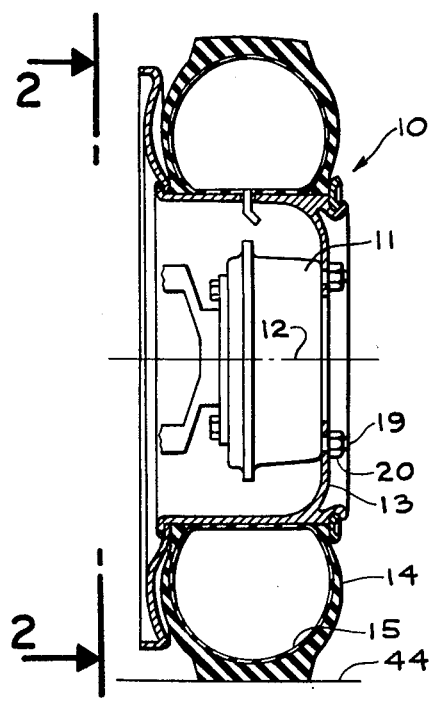
FIG. 1 is a vertical axial central section through a safety wheel and tire arrangement constructed in accordance with the invention.

FIG. 1 illustrates at 10 a safety wheel assembly embodying the invention which is especially desirable for use as the front wheel of a truck or other similar heavy vehicle. The wheel mounting hub is represented somewhat diagrammatically at 11, and is mounted to turn about a horizontal axis 12 which of course swings horizontally to different positions as the wheel is steered. Attached rigidly to hub 11 is an annular wheel body 13 about which a truck tire 14 typically containing an inner tube 15 is mounted.

Wheel body 13 has the usual mounting flange 16, extending radially inwardly to an inner annular edge 17, and containing circularly spaced apertures 18 through which lug bolts 19 projecting from hub 11 extend. Lug nuts 20 are then tightenable onto bolts 19 to tightly and rigidly secure the mounting flange 16 to the hub.

As the mounting flange 16 extends radially outwardly it may curve slightly axially at 21 to merge integrally with and rigidly carry an annular rim portion 22 of the wheel body. This rim portion has a radially outer annular tire engaging surface 23, which is centered about axis 12 of the wheel, with an opening 24 extending through a central portion of the rim to pass inflation stem 25 radially inwardly to a location accessible for filling air into the inner tube.

Figure 2:
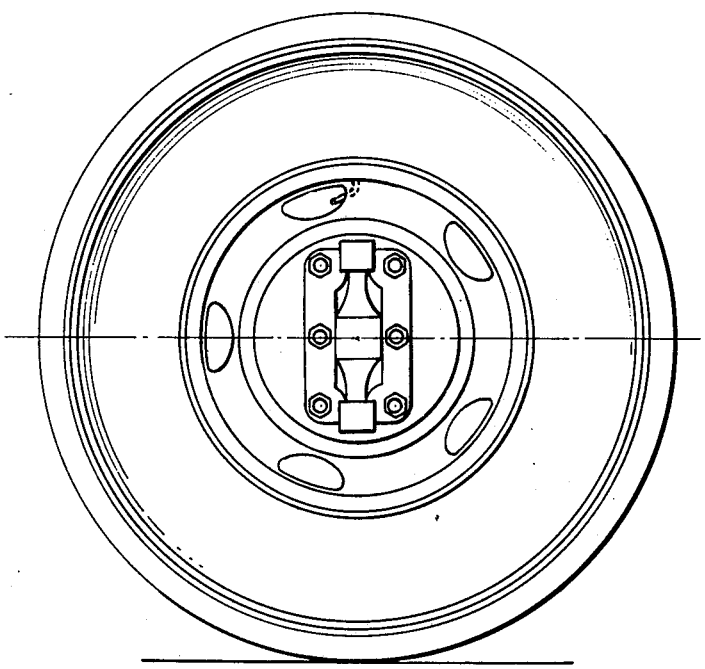
FIG. 2 is a side elevational view taken on line 2—2 of FIG. 1.

At its axially outer side (the right side in FIGS. 1 and 3), the wheel body 13 is shaped to have an annular portion 26 containing an annular radially outwardly facing groove 27 within which a conventional resilient retaining ring 28 is received. This ring 28 is interrupted at one location about its circular extent, but otherwise is annular about axis 12, and tends by its own resilience to constrict radially inwardly into groove 27 and remain therein. The ring 28 projects radially outwardly beyond the diameter of outer surface 23 of the rim, to form a substantially annular shoulder 29, extending approximately directly radially with respect to axis 12, and facing axially inwardly (leftwardly in FIGS. 1 and 2) to form an abutment against which the outer annular bead 30 of the tire is engageable to retain it against axial expanding movement.

At the axially inner side of tire 14, there is provided a safety flange 31, with which the present invention is particularly concerned. This flange 31 may be cast or otherwise formed integrally with rim 22 and the remainder of the wheel body 13, but preferably for fabrication purposes is made as a separate annular part welded annularly to rim 22 at 32. Flange 31 may be stamped to the illustrated annular configuration from high strength sheet metal, such as steel, and desirably has an inner annular edge 33 which is received about and is a close fit on outer cylindrical surface 23 of the rim. Axially inwardly beyond flange 31, the rim portion 22 of the wheel body has an edge portion 34 which is turned radially outwardly a short distance to form a shallow annular shoulder 35 against which the radially inner portion of flange 31 is engageable, to positively retain the flange against leftward movement relative to the rim as viewed in FIG. 3. During manufacture of the wheel, flange 31 may be slipped leftwardly onto rim 22 and into engagement with shoulder 35, and the welded connection 32 between the parts may then be formed to rigidly connect the flange to the remainder of the wheel body for handling thereafter as a single unitary structure.

Figure 3:
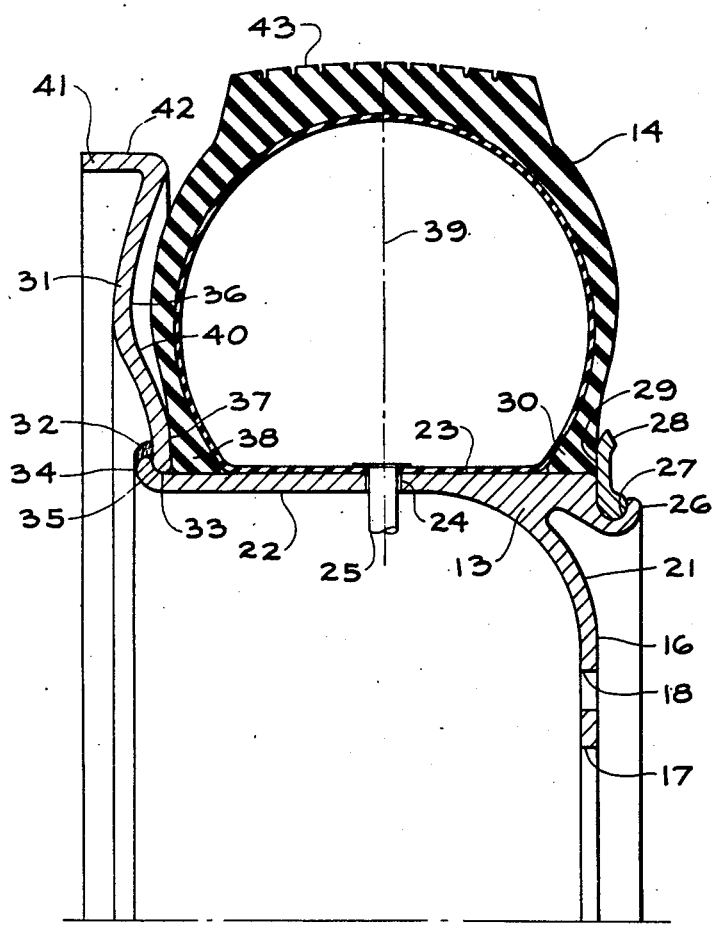
FIG. 3 is an enlarged vertical section corresponding to the upper portion of FIG. 1.

At a side adjacent the tire, flange 31 has an annular surface 36 whose radially inner portion 37 forms an annular shoulder engageable with the second bead 38 of the tire to retain it against leftward movement in FIG. 3. As will be apparent, this surface area 37 formed at the inner extremity of the flange and the opposed inner surface 29 of the ring 28 are symmetrical with respect to a central plane 39 of the wheel and tire extending perpendicular to axis 12 at the center of the axial thickness of the tire.

In extending radially outwardly from rim 22, flange 31 may first extend approximately directly radially at the location of the discussed surface area 37, and then curve axially away from the tire at 40 to follow generally the curvature of the tire but in spaced relation thereto, with the peripheral portion of the rim being turned directly axially away from the tire to form an annular rim 41 of the safety flange having an outer cylindrical surface 42 centered about axis 12 and of a diameter slightly less than the diameter of outer surface 43 of the fully inflated tire. As a typical example, it is presently preferred that the diameter of surface 42 of the safety flange be approximately two inches less than the diameter of outer surface 14 of the tire when inflated and under load.

In using the illustrated safety wheel assembly, two of these assemblies are mounted on the two front wheels of a truck or other heavy vehicle, with the safety flanges 31 being located at the axially inner side of each of the wheels. During normal operation of the vehicle, the inflated tires engage and roll along the road surface in a manner maintaining rims 41 of safety flanges 31 above the road surface (44 in FIG. 1). If one of the tires becomes deflated for any reason, such deflation allows rim 41 of the associated safety flange 31 to move downwardly into engagement with the road surface, and roll along that surface to support the vehicle at that wheel location in almost the same manner as when the tire was inflated. The driver thus retains relatively full control of the vehicle, and can bring it to a stop without an accident. The tire can then be removed from the wheel in the usual manner by expanding retaining ring 28 radially outwardly for removal from groove 27 to allow the tire and its inner tube to be slid axially outwardly (rightwardly in FIG. 3) off of the rim 22. Another tire or the same tire after repair can be remounted on the rim in reverse manner and then retained by repositioning ring 28 in groove 27.

An additional advantage of the present safety rim resides in the fact that it can be utilized for assisting in supporting the wheel while a tire is removed from or replaced on the rim. For this purpose, the wheel may first be jacked up to a level at which the bottom of the tire is slightly off of the road surface, and may then be retained in that elevated position by placement of an elongaged board or other member of appropriate vertical thickness on the road surface and beneath the lowermost portion of rim 41 of the safety flange 31, to support the safety flange above the road surface and thereby support the wheel at a level high enough to permit the tire to be moved off of and onto the wheel body.

While a certain specific embodiment of the present invention has been disclosed as typical, the invention is of course not limited to this particular form, but rather is applicable broadly to all such variations as fall within the scope of the appended claims.

We claim:

1. A safety wheel comprising:
a wheel body having a rim portion about which an inflatable tire is to be received, and having a mounting flange portion extending generally radially inwardly from said rim portion and containing apertures for connection to the wheel body of a vehicle;
said rim portion of the wheel body having an essentially cylindrical outer surface about which the tire is received, and having a portion deformed to provide a radially outwardly turned essentially annular shoulder integral with the rest of the rim portion and located at the axially inner side thereof and projecting radially outwardly beyond said cylindrical surface;
a safety flange formed separately from said wheel body and having a radially annular inner edge portion received about and of a diameter corresponding approximately to said cylindrical surface on the wheel body at a location axially between said shoulder and the tire;
said radially inner portion of said safety flange having a surface engageable with a first bead of the tire to retain the tire at its axially inner side;
a weld at the side of said safety flange facing away from the tire and rigidly securing the safety flange to said outwardly turned shoulder of the rim portion of the wheel body;
said safety flange extending generally radially outwardly at the axially inner side of the tire to a peripheral edge which is of a diameter slightly less than the external diameter of the tire and adapted to engage a road surface and support the vehicle upon deflation of the tire;
said rim portion of the wheel body containing an essentially annular groove at the axially outer side of the tire; and
a resilient retaining ring detachably receivable within said groove and acting to retain an outer bead of the tire against expanding movement.

2. A safety wheel as recited in claim 1, in which said weld is an essentially annular weld extending circularly along a radially outer edge of said outwardly turned shoulder on the rim portion of the wheel body and bonded annularly to said edge of the shoulder and to an adjacent surface of the safety flange.

* * * * *